United States Patent
Lygner et al.

(10) Patent No.: US 9,835,250 B2
(45) Date of Patent: Dec. 5, 2017

(54) METHOD FOR CONTROLLING AN ACTUATOR OF A VEHICLE TRANSMISSION

(71) Applicant: VOLVO TRUCK CORPORATION, Göteborg (SE)

(72) Inventors: Oskar Lygner, Alingsås (SE); Fredrik Karpenman, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/314,112

(22) PCT Filed: Nov. 5, 2014

(86) PCT No.: PCT/EP2014/025011
§ 371 (c)(1),
(2) Date: Nov. 28, 2016

(87) PCT Pub. No.: WO2015/192865
PCT Pub. Date: Dec. 23, 2015

(65) Prior Publication Data
US 2017/0211690 A1    Jul. 27, 2017

Related U.S. Application Data

(60) Provisional application No. 62/012,692, filed on Jun. 16, 2014.

(51) Int. Cl.
*F16H 61/12* (2010.01)
*F16H 63/30* (2006.01)

(52) U.S. Cl.
CPC ......... *F16H 61/12* (2013.01); *F16H 63/3023* (2013.01); *F16H 2063/3093* (2013.01)

(58) Field of Classification Search
CPC ... F16H 61/08; F16H 61/12; F16H 2061/1204
See application file for complete search history.

(56) References Cited

U.S. PATENT DOCUMENTS 5,460,583 A * 10/1995 Kitada .................... F16H 61/08
    477/148
2006/0096398 A1 * 5/2006 Stengel .................. F16H 59/68
    74/335

(Continued)

FOREIGN PATENT DOCUMENTS

| EP | 1055847 A2 | 11/2000 |
| EP | 1232901 A2 | 8/2002 |
| WO | 2007132106 A1 | 11/2007 |

OTHER PUBLICATIONS

International Search Report (dated Mar. 3, 2015) for corresponding International App. PCT/EP2014/025011.

(Continued)

*Primary Examiner* — Edwin A Young
(74) *Attorney, Agent, or Firm* — WRB-IP LLP (57) ABSTRACT

A method is provided for controlling an actuator of a vehicle transmission, the actuator being connected to an engaging sleeve, the engaging sleeve being axially displaceable between a gear wheel disengaging position and a gear wheel engaging position of the vehicle transmission for executing a transmission gear shift. The method includes actuating the actuator during a first predetermined time period for initiating a translational movement of the engaging sleeve front the gear wheel disengaging position towards the gear wheel engaging position, wherein the first predetermined time period is smaller than a total time period for the engaging sleeve to reach the gear wheel engaging position, determining, during a second predetermined time period initiated after the duration of the first predetermined time period, if the engaging sleeve has reached the gear wheel engaging position, and actuating the actuator during a third predetermined time period if it was determined that the engaging sleeve failed to reach the gear wheel engaging position during the second predetermined time period. A correspond- (Continued)

ing computer, computer readable medium, control unit, and vehicle transmission are also provided.

12 Claims, 4 Drawing Sheets

(56) References Cited

U.S. PATENT DOCUMENTS

2012/0316031 A1* 12/2012 Hathaway ............... F16H 61/12
477/107
2012/0323456 A1* 12/2012 Kato ..................... B60W 10/08
701/55

OTHER PUBLICATIONS

International Preliminary Report on Patentability (dated Jul. 4, 2016) for corresponding International App. PCT/EP2014/025011.

* cited by examiner

METHOD FOR CONTROLLING AN ACTUATOR OF A VEHICLE TRANSMISSION

BACKGROUND AND SUMMARY

The present invention relates to a method for controlling an actuator of a vehicle transmission. The invention also relates to a corresponding computer program, computer readable medium, control unit, and vehicle transmission. The invention is applicable on vehicles, in particularly heavy duty vehicles such as e.g. trucks or working machines. However, although the invention will mainly be described in relation to a truck, the invention is of course also applicable for other type of vehicles, such as e.g. cars or buses, etc.

In relation to vehicle transmissions, for example, transmissions used in heavy duty vehicles such as trucks or buses etc., an automated manual transmission is often utilized. The automated manual transmission changes gear automatically such that gear and specific time of changing gear is executed automatically. It is common and well known to execute a gear shift when the gears are synchronized, i.e. the relative speed between the engaging sleeve and the gear to be engaged are approximately zero. However, in some applications non-synchronized gear shift occurs and in these applications it is of great importance to control the gear shift such as to achieve a reduction of unwanted noise as well as to reduce dynamic loads.

Prior art solutions provides a method for executing a non-synchronous gear shift in a vehicle transmission by supplying a force on the engaging sleeve such that the engaging sleeve is forced in a direction towards the gear wheel to be engaged. The engaging sleeve thereafter reaches the gearwheel to be engaged whereby gear shift occurs. However, this method for shifting gear is often associated with the provision of high dynamic loads and unwanted noise when the engaging sleeve hits the gear to be engaged in the axial direction thereof. The dynamic loads may, if they are too severe, result in a reduction of gearbox component durability, as well as to negatively affect gearbox electronics due to shock loads resulting from the dynamic loads.

There is thus a need to provide a method for executing non-synchronized gear shift in a vehicle transmission that reduces associated dynamic loads and hence provides for increased durability of transmission components.

It is desirable to provide a method which reduces the dynamic loads and unwanted noise when executing a gear shift in a vehicle transmission.

According to a first aspect of the invention, there is provided a method for controlling an actuator of a vehicle transmission, the actuator being connected to an engaging sleeve, the engaging sleeve being axially displaceable between a gear wheel disengaging position and a gear wheel engaging position of the vehicle transmission for executing a transmission gear shift, wherein the method comprises the steps of actuating the actuator during a first predetermined time period for initiating a translational movement of the engaging sleeve from the gear wheel disengaging position towards the gear wheel engaging position, wherein the first predetermined time period is smaller than a total time period for the engaging sleeve to reach the gear wheel engaging position; determining, during a second time period initiated after the duration of the first time period, if the engaging sleeve has reached the gear wheel engaging position; and actuating the actuator during a third predetermined time period if it was determined that the engaging sleeve failed to reach the gear wheel engaging position during the second predetermined time period.

The wording "gear wheel disengaging position" should in the following and throughout the entire description be interpreted as a position of the engaging sleeve where the engaging sleeve is not in final meshed connection with the desired gear wheel to be engaged when executing a gear shift. The gear wheel disengaging position may thus be a position where the engaging sleeve is in no connection to any gear wheel, i.e. a neutral position, or it may be a position where the engaging sleeve is in meshed connection to a gear wheel, but which gear wheel is not the gear wheel that is to be engaged after execution of the gear shift is completed. For example, when executing a gear shift from a first gear to a second gear, the engaging sleeve may in the initial state, before gear shift has been initiated, be in meshed connection to a first gearwheel. When the gear shift thereafter has been initiated and executed, the engaging sleeve is in meshed connection to a second gear wheel. In this example scenario, the meshed connection between the engaging sleeve and the first gear wheel should thus be interpreted as the gear wheel disengaging position even though the engaging sleeve in it self is in an engaging position to a gear wheel. Likewise and according to the above example scenario, the gear wheel engaging position should thus be interpreted as the position when the engaging sleeve is in final meshed connection with the second gear heel, i.e. when the gear shift has been executed and is completed.

Furthermore, the first predetermined time period and the second predetermined time period should be interpreted as two separate time periods. Hence, the second predetermined time period should be interpreted as a time period which is initiated after the first predetermined time period is finished. It should hence be understood that the actuator is not actuated during the second time period. The actuator is thus disengaged, or deactivated, during the second time period. It should also be understood that the duration of each of the predetermined time periods may be different depending on the specific application or prerequisites of the vehicle. For example, the first predetermined time period may have shorter time duration if the vehicle transmission is operated in a normal operating temperature in comparison to executing the method before normal operating temperature is achieved. Outside air temperature is another parameter affecting the time duration of the first predetermined time period.

Still further, already available transmission sensors may be utilized to determine whether the engaging sleeve is in the engaging position or not.

The present invention is based on the insight that by actuating the actuator for a short first predetermined time period, in order to initiate the translational movement of the actuator towards the gear wheel engaging position, will be sufficient to transport the engaging sleeve to the gear wheel engaging position. However, if the teeth of the engaging sleeve will, for example, hit the teeth of the gear wheel to be engaged during the predetermined second time period, the forces on the engaging sleeve directing the engaging sleeve towards the engaging position will eventually be reduced to limits that will not be able to fully engage the engaging sleeve when the teeth of the engaging sleeve is no longer in connection with the teeth of the gear wheel. The invention is thus also based on the insight that further actuation of the actuator should be executed if it is determined that the engaging sleeve has not reached the gear wheel engaging position during the second predetermined time period, such that an axial force is provided to the engaging sleeve to enable the engaging sleeve to be engaged.

The advantages of the present invention is that the dynamic loads when the teeth of the engaging sleeve hit the teeth of the gear wheel to be engaged, in the axial direction, will be reduced in comparison to actuating the actuator during the complete cycle from a disengaged position to an engaged position of the engaging sleeve. According to an example embodiment, the method may further comprise the consecutive step of actuating the actuator until it is determined that the engaging sleeve has reached the gearwheel engaging position if the engaging sleeve failed to reach the gear wheel engaging position within a predetermined maximum allowable time period.

Hereby, the actuator provides a force on the engaging sleeve until it is fully engaged, in order to execute the gear shift during a reasonable time limit. An advantage is that a forced gear shift is provided if it is determined that further provision of actuating pulses will not complete the gear shift until an excessive time period has lapsed. However, it should be readily understood that further actuating pulses could be provided to the actuator after the above described third predetermined time period and before the predetermined maximum allowable time period has lapsed.

According to an example embodiment, the method may further comprise the step of rotating the engaging sleeve around an axially extending geometric axis relative to a gear wheel to be engaged if the engaging sleeve failed to reach the gear wheel engaging position within the predetermined maximum allowable time period.

An advantage is that further provision for positioning the engaging sleeve in the gear wheel engaging position is provided. Hereby, if the engaging sleeve is stuck in a position where the edge of the teeth of the engaging sleeve is in contact with the edge of the teeth of the gearwheel to be engaged, a rotation of the engaging sleeve in relation to the gear wheel to be engage may enable the engaging sleeve to be further directed to the gear wheel engaging position. This may be advantageously combined with the above described example embodiment of actuating the actuator until the engaging sleeve is engaged.

According to an example embodiment, the first time period may end when teeth of the engaging sleeve collide with teeth of a gearwheel to which the engaging sleeve is to be connected.

Hereby, a preset and well defined time period is provided. Also, actuating the actuator until the teeth of the engaging sleeve hit the teeth of the gear wheel to which the engaging sleeve is to be engaged may provide an actuating pulse which is sufficient for further directing the engaging sleeve to the gear wheel engaging position after the teeth of the engaging sleeve is aligned with the root of the gear wheel.

According to an example embodiment, the actuator may be a pneumatic cylinder comprising a shift rod connected to the engaging sleeve.

A pneumatic cylinder is easy to handle and can utilize an already available air/gas pressure supply tank of the vehicle to which the transmission is provided. Other types of actuators are of course conceivable, such as e.g. a hydraulic actuator or an electrically controlled actuator.

According to an example embodiment, the pneumatic cylinder may be controlled by means of at least one valve arranged in fluid communication between the pneumatic cylinder and an air pressure supply tank.

The wording "fluid communication" should be understood to include communication by means of air/gas. Hence, the wording "fluid communication" should include an air/gas communication between the pneumatic cylinder and the air pressure supply tank.

An advantage is that the valves are easy to control and can thus be connected to a control unit that determines when to open and close the valve such that the actuator is actuated/deactivated.

According to an example embodiment, the time periods for actuating the pneumatic cylinder may be controlled by means of positioning the at least one valve in an open state such that pressurized air is supplied from the air pressure supply tank to the pneumatic cylinder.

According to an example embodiment, the transmission gear shift may be a non-synchronized gear shift.

A non-synchronized gear shift should be interpreted as a gear shift where the rotational speed of the engaging sleeve is not synchronized with the rotational speed of the gear wheel to which the engaging sleeve is to be engaged. Advantages of a non-synchronized gear shift is that less components are required in comparison to a synchronized gear shift, arrangement, since e.g. a traditional synchromesh unit is not needed. Also, the components generally have a lower weight. Hence, the non-synchronized gear is cheaper than a synchronized gear shift arrangement.

According to a second aspect of the present invention, there is provided a computer program comprising program code means for performing any of the above described steps in relation to the first aspect of the present invention when the program is run on a computer. According to an example, the computer may be an embedded realtime system.

According to a third aspect of the present invention, there is provided a computer readable medium carrying a computer program comprising program code means for performing any of the above described steps in relation to the first aspect of the present invention when the computer program is run on a computer. According to an example, the computer may be an embedded real-time system.

According to a fourth aspect of the present invention, there is provided a control unit connectable to a vehicle transmission comprising an actuator connected to an engaging sleeve, wherein the engaging sleeve is axially displaceable between a gear wheel disengaging position and a gearwheel engaging position of the vehicle transmission, wherein the control unit is configured to actuate the actuator during a first predetermined time period for initiating a translational movement of the engaging sleeve from the gear wheel disengaging position towards the gearwheel engaging position, wherein the first predetermined time period is smaller than a total time period for the engaging sleeve to reach the gearwheel engaging position; determine, during a second time period initiated after the duration of the first time period, if the engaging sleeve has reached the gear wheel engaging position; and actuate the actuator during a third predetermined tinge period if it was determined that the engaging sleeve failed to reach the gear wheel engaging position during the second predetermined time period.

According to an example embodiment, the vehicle transmission may further comprise at least one valve arranged in fluid communication with the actuator, wherein the control unit is connected to the at least one valve and configured to control the valve to be positioned in an open state or a closed state.

According to a fifth aspect of the present invention, there is provided a vehicle transmission comprising a control unit as described in relation to the fourth aspect of the present invention. According to an example embodiment, the transmission may be an automated manual transmission.

Effects and features of the second, third, fourth, and fifth aspects of the present invention are similar to those described above in relation to the first aspect of the present invention.

Further features of, and advantages with, the present invention will become apparent when studying the appended claims and the following description. The skilled person realize that different features of the present invention may be combined to create embodiments other than those described in the following, without departing frond the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAIL DESCRIPTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
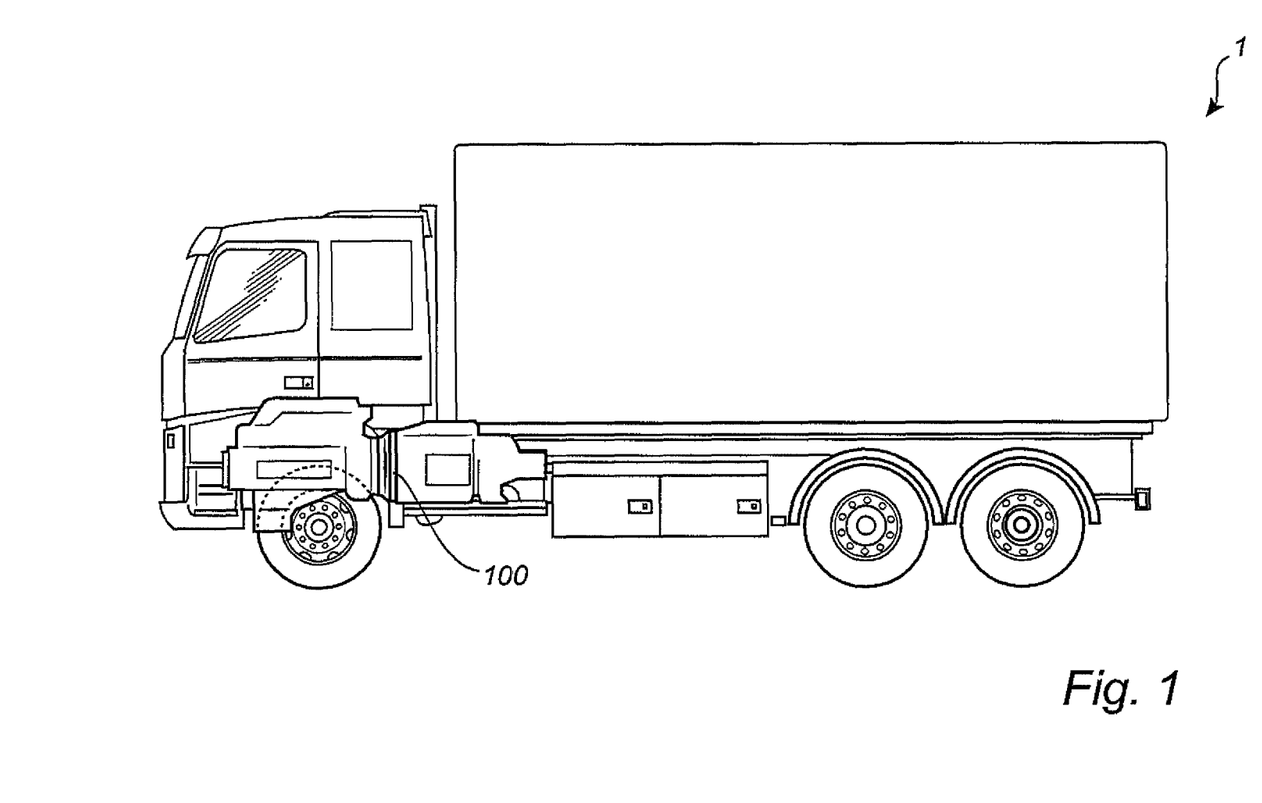
FIG. 1 is a side view of a truck provided with a vehicle transmission utilizing the method according to an example embodiment of the present invention.

With particular reference to FIG. 1, there is provided a vehicle 1 with a transmission 100 according to the present invention. The vehicle 1 depicted in FIG. 1 is a truck for which the inventive transmission and associated method for controlling the actuator, as will be described further below, is particularly suitable for.

Figure 2:
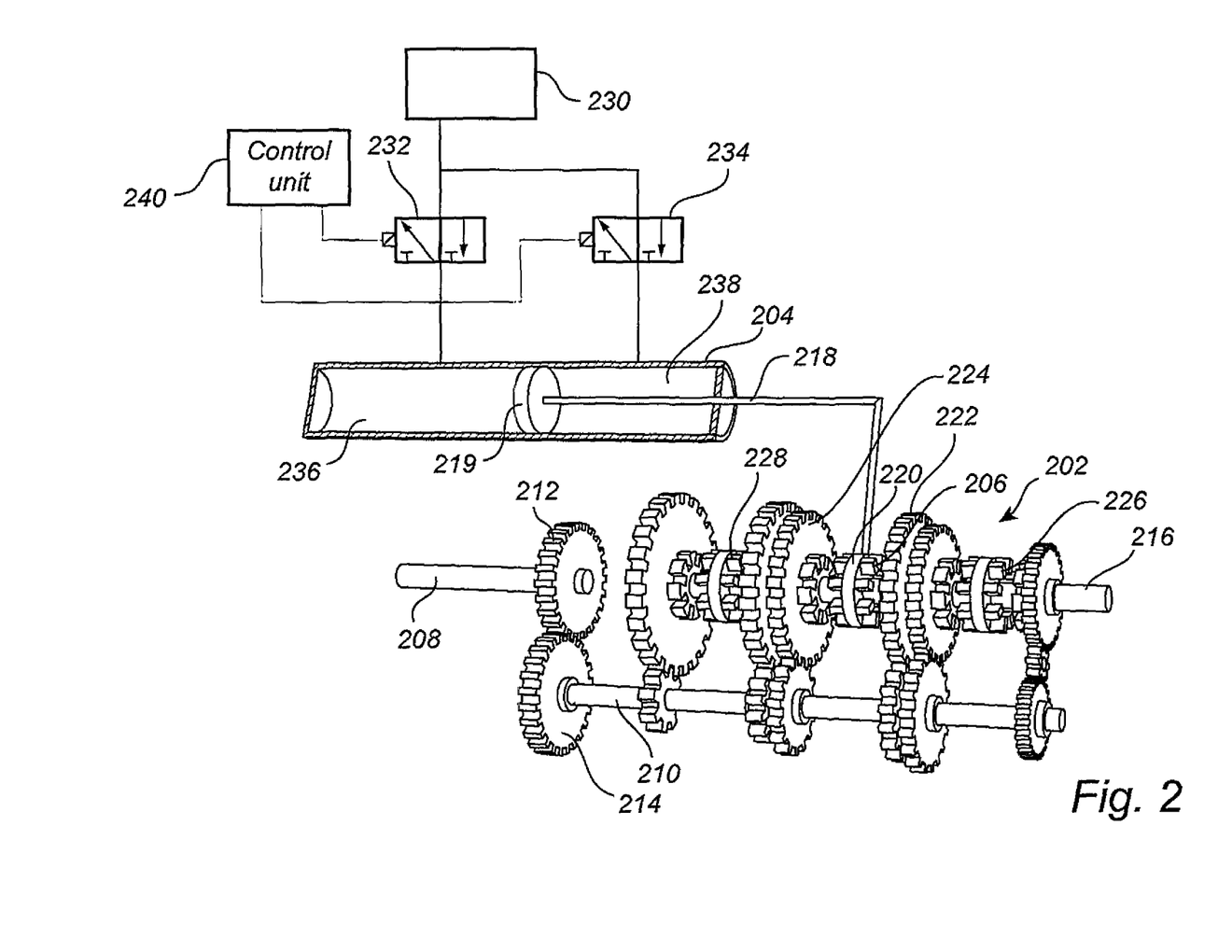
FIG. 2 is a schematic view illustrating an actuator and a portion of a vehicle transmission according to an example embodiment of the present invention.

Turning to FIG. 2, there is illustrated a portion of a vehicle transmission 202 which is connected to an actuator 204 for controlling an engaging sleeve 206. The actuator 204 is illustrated in a cut-out view for simplicity of understanding. More specifically, the vehicle transmission 202 comprises a transmission input shaft 208 which is connected to a vehicle engine (not shown). The transmission input shaft 208 is in turn connected to a transmission counter shaft 210 by means of a pair of gear wheels 212, 214 in meshed connection with each other. Furthermore, the counter shaft 210 is further connected to a transmission main shaft 216 by means of timber gear wheels in meshed connection with each other. Although FIG. 2 depicts the transmission input shaft 208 being connected to the transmission main shaft 216 via the transmission counter shaft 210, other alternatives are of course conceivable, such as e.g. a direct connection between the transmission input shaft 208 and the transmission main shaft 216. Also, the vehicle transmission 202 may, as an alternative, comprise two input shafts.

Furthermore, the arrangement depicted in FIG. 2 comprises, the actuator 204, which in the example embodiment is a pneumatic actuator in the form of a double acting pneumatic cylinder. The actuator 204 comprises a shift rod 28 having a sealing member 29 dividing the actuator 204 into a piston side 236 and a piston rod side 238. The shift rod 218, and the sealing member 219, are arranged to reciprocate in the actuator 204. The shift rod 218 is in turn connected to a shift yoke 220. The shift yoke 220 is configured to engage with the engaging sleeve 206 for connecting the engaging sleeve 206 to a first gear wheel 222 of the main shaft 216 such that the first gear wheel 222 is mechanically connected to the main shaft 216. More specifically, there is provided a bearing arrangement (not shown) between the first gearwheel 222 and the main shaft 216, such that no forces, or torques, are transmitted between the first gear wheel 222 and the main shaft 26 when the first gearwheel 222 is disengaged. The actuator 204, or the shift rod 218 of the actuator 204, can axially displace the engaging, sleeve 206 such that the first gear wheel 222 is connected to the main shaft 216, thereby providing a force, or torque, between the first gearwheel 222 and the main shaft 216. The shift yoke 220 depicted in FIG. 2 is further configured to axially move the engaging sleeve 206 between the first gear wheel 222 and a second gear wheel 224, for engaging/disengaging the first 222 and second 224 gear wheels to/from the main shaft 216. The shift yoke 220 can also position the engaging sleeve 206 in a neutral position between the first 222 and the second 224 gear wheels such that neither one of the gear wheels 222, 224 are mechanically connected to the main shaft 216. Although FIG. 2 only illustrates a single actuator 204, it should be readily understood that also the remaining engaging sleeves 226, 228 of the main shaft 216 are connected to a respective actuator for executing gear shifts.

Moreover, the actuator 204 is further connected to a pressure supply tank 230. The pressure supply tank 230 is in the example embodiment an air tank comprising pressurized air. More specifically, the actuator 204 is in fluid communication with the pressure supply tank 230 via a first 232 and a second 234 valve. The first valve 232 is arranged in fluid communication between the pressure supply tank 230 and the piston side 236 of the actuator 204, while the second valve 234 is arranged, in fluid communication between the pressure supply tank 230 and the piston rod side 238 of the actuator 204. The valves 232, 234 are further connected to a control unit 240 which controls the actuation and deactivation of the valves 232, 234 in order to determine when pressurized air should be provided to either the piston side 236 of the actuator 204 or to the piston rod side 238 of, the actuator 204, or not to provide pressurized gas to the actuator 204 at all. The first 232 and second 234 valves illustrated in FIG. 2 are electrically controlled valves, such as e.g. electrically controlled solenoids, which are electrically connected to the control unit 240.

However, other type of valves is of course conceivable, such as e.g. mechanically controlled valves which are actuated by means of a spring or hydraulic fluid, etc. Also, the pressure supply tank may of course contain other type of gases depending on the specific application. Also, in case the actuator is e.g. a hydraulic actuator, the pressure supply tank may instead comprise pressurized hydraulic fluid.

The following will describe the function of the actuator. When the control unit actuates the first valve 232, and at the same time deactivates the second valve 234, pressurized air is directed from the pressure supply tank 230 and into the piston side 236 of the actuator 204. Hereby, the shift rod 218 and the sealing member 219 are axially displaced within the actuator 204 in a direction towards the piston rod side 238 of the actuator. Hereby, the volume of the piston side 236 is increased while the volume of the piston rod side 238 is decreased. When the control unit 240 actuates the first valve 232 the shift yoke 220 directs the engaging sleeve 206 towards the first gear wheel 222. Eventually, the engaging sleeve 206 will be provided in an engaged position such that the first gear wheel 222 is mechanically connected to the main shaft 216.

When it thereafter is decided that the first gear wheel 222 should be disengaged from the main shaft 216, the control unit 240 actuates the second valve 234 and deactivates the first valve 232. Hereby, pressurized gas is provided from the pressure supply tank 230 into the piston rod side 238 of the actuator 204 such that the shift rod 218 and the sealing member 29 are axially displaced within the actuator 204 towards the piston side 236 of the actuator 204. The air previously provided to the piston side 236 of the actuator 204 is released into e.g. the surrounding environment of the vehicle transmission 202. The air discharged from the piston side 236 of the actuator 204 can, instead of being discharged to the surrounding environment of the vehicle transmission 202, also be provided into seine sort of tank or collecting vessel, or the like.

When the shift rod 218 and the sealing member 219 are directed towards the piston side 236 of the actuator 204, the engaging sleeve will be displaced from the gear wheel engaged position of the first gear wheel 222 to a gear wheel disengaged position where the first gearwheel is no longer mechanically connected to the main shaft via the engaging sleeve.

Figure 3A:
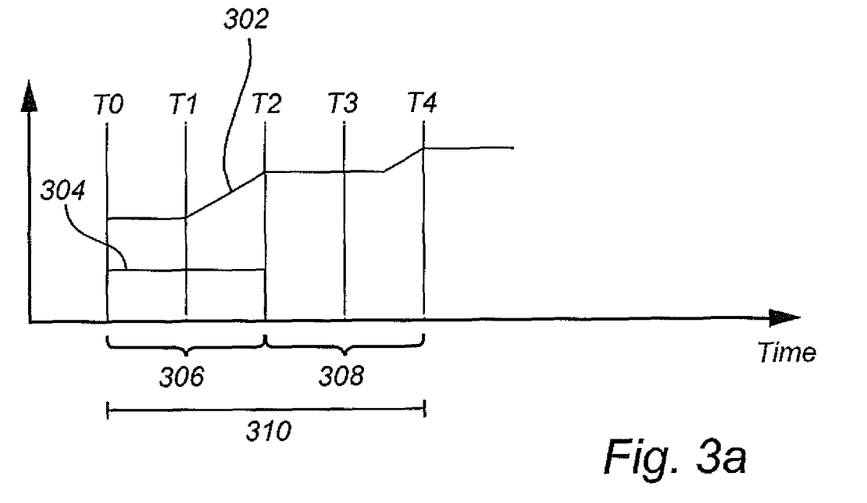
FIGS. 3a-3b illustrate example embodiments of a respective gear change scenario according to the present invention.
Figure 3B:
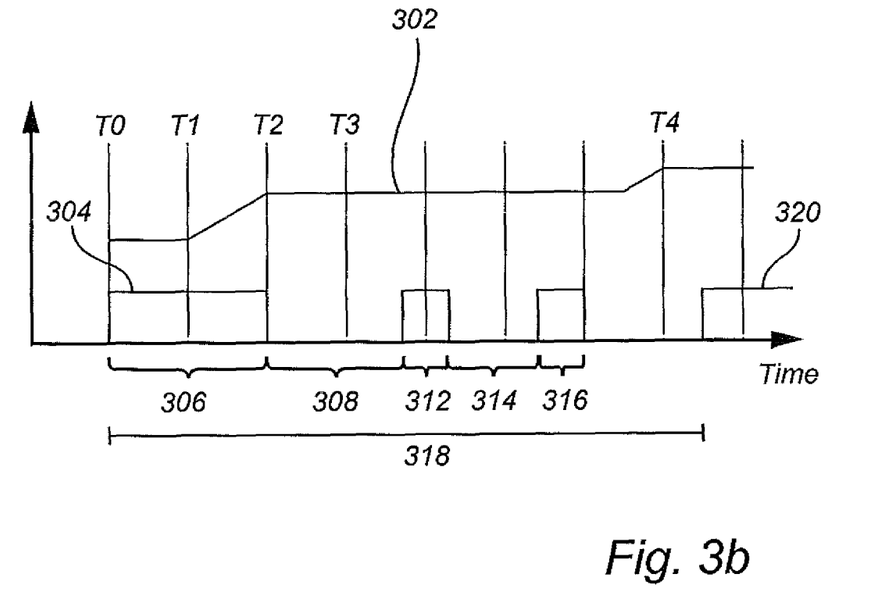

Turning now to FIGS. 3a and 3b which illustrate two example embodiments of a gear change scenario by use of the method according to the present invention. Firstly, a description will be made in relation to FIG. 3a which illustrates an example embodiment wherein the engaging sleeve 206 is provided into the gear wheel engaged position relatively smoothly, i.e. after the control unit 240 actuates one of the valves 232, 234 for positioning the engaging sleeve 206 in the gear wheel engaging position, the engaging sleeve 206 is positioned in the engaged position at a relatively short time period after the teeth of the engaging sleeve hit the teeth of the gear wheel to which the engaging sleeve is to be connected. FIG. 3b on the other hand illustrates an example embodiment where, during the engagement process, the engaging sleeve 206 is positioned in the gear wheel engaging position at a relatively long time period after the teeth of the engaging sleeve hit the teeth of the gear wheel to which the engaging sleeve is to be connected. Hence, FIG. 3a illustrates a rapid engagement process while FIG. 3b illustrates a slightly less rapid engagement process.

Reference is thus first made, to FIG. 3a which illustrates a gear shift scenario according to an embodiment of the present invention. The x-axis of the graph is the elapsed time period of the engaging process, i.e. the time period of the gear shift, while the y-axis is the position 302 of the engaging sleeve 206 as well as the actuation degree 304 of one of the valves 232, 234. It should be understood that the gear change scenario depicted in FIG. 3a is applicable for actuation of either one of the first 232 and the second 234 valves, but the following will only refer to actuation and deactivation of the first valve 232 for simplicity of understanding the invention.

At time T0, the first valve 232 is actuated, i.e. the first valve 232 is positioned in an open state and pressurized air from the pressure supply tank 230 is provided into the piston side 236 of the actuator 204, Hence, at T0 the first valve 232 is actuated 304. Further, at T1, the shift rod 218, the shift yoke 220 and the engaging sleeve 206 initiates an axial movement towards the gear wheel to be engaged, i.e. towards the gear wheel engaging position. The shift rod 218, shift yoke 220 and engaging sleeve 206 continues to be directed towards the wheel to be engaged until the teeth of the engaging sleeve 206 collide with the teeth of the gear wheel to which the engaging sleeve is to be connected, which is illustrated as taking place at time T2. At T2, the control unit 240 also deactivates the first valve 232 such that no further supply of pressurized air is provided into the piston side of the actuator 204. Hereby, the actuator 204 has been actuated for a first predetermined time period 306. It should however be understood that the engaging sleeve does not necessarily have to arrive at the position where it collides with the gear wheel to which it is to be engaged at the same time as the control unit 240 deactivates the first valve 232. Hence, the time T2 when the control unit deactivates the first valve 232 may take place before/after the teeth of the engaging sleeve collide with the teeth of the gear wheel. Between time T2 and time T3, the velocity of the engaging sleeve 206 is approximately zero and the forces which aim at further directing the engaging sleeve towards the gear wheel engaging position is decreased since the actuator is no longer actuated. At time T3, the teeth of the engaging sleeve 206 are however no longer in contact with the teeth of the gearwheel. Hereby, the engaging sleeve 206 can continue to be directed towards its gear wheel engaging position, which is executed at time T4. Hence, at T4 the engaging sleeve is positioned in the gear wheel engaging position and the gear shift is completed and the engaging sleeve reached the gearwheel engaging position within a second predetermined time period 308 which was initiated after the duration of the first time period 306. The engaging sleeve reached the gear wheel engaging position during a total time period denoted as 310.

Due to the relatively short time period from the instant time T2 when the teeth of the engaging sleeve collided with the teeth of the gear wheel, until the instant time T3 when the engaging sleeve continues to be directed towards the gear wheel engaging position, the forces provided to the actuator during the first predetermined time period is sufficient to complete the gear shift procedure.

During an ideal shift procedure, i.e. when there is no collision between the teeth of engaging sleeve and the teeth of the gear wheel to which the engaging sleeve is to be connected, instant time 12 and instant time 13 are one and the same time, i.e. they will coincide.

Reference is now instead made to FIG. 3b which illustrates another gear shift scenario according to an embodiment of the present invention. The x-axis and the y-axis represent the same parameters as described above in relation to FIG. 3a.

Further, time steps T0 to T2 are similar to those described above in relation to FIG. 3a. Hence, at T2, the first predetermined time period 306, when the actuator was actuated, has lapsed and the teeth of the engaging sleeve have collided with the teeth of the gear wheel. After the duration of the second predetermined time period 308 it is determined that the engaging sleeve 206 has not reached the gear wheel engaging position. Hereby, it is determined that further actuation of the actuator 204 is necessary in order to provide a force on the shift rod 218 such that the shift rod is able to further direct the engaging sleeve to the gear wheel engaging position.

Hence, after the duration of the second predetermined time period 308, the actuator 206 is again actuated during a third predetermined time period 312. Hereby, a further three is provided to the shift rod 218. The actuator will, after the duration of the third predetermined time period be deactivated during a fourth predetermined time period 314. If the engaging sleeve 206 has not reached the gearwheel engaging position after the duration of the fourth predetermined time period 314 has lapsed, the control unit 240 will again, during a fifth predetermined time period 36, actuate the actuator 204. Thereafter, according to the example embodiment depicted in FIG. 3b, the teeth of the engaging sleeve 206 is no longer in connection with the teeth of the gear wheel and the engaging sleeve 206 can continue to be directed towards the gear wheel engaging position at T4.

In the example embodiment depicted in FIG. 3b, the engaging sleeve reaches the gear wheel engaging position after the actuator 204 was actuated during the fifth predetermined time period. However, in a case where the engaging sleeve 206 fails to reach the gear wheel engaging position within a predetermined maximum allowable time period 318, the control unit 240 actuates the actuator 204 until the engaging sleeve 206 is positioned in the gear wheel engaging position. Hence, if it takes to long time to execute the gear shift, a final actuation 320 of the actuator 204 is executed, in conjunction with the final actuation 320 of the actuator, the engaging sleeve may be rotated in relation to the gear wheel to which the engaging sleeve is to be connected in order to further facilitate connection there between.

The advantages of providing the short actuating pulses within the predetermined time periods is that the dynamic forces of the system is reduced while still upholding a force which is sufficient for directing the engaging sleeve to the gear wheel engaging position.

Figure 4:
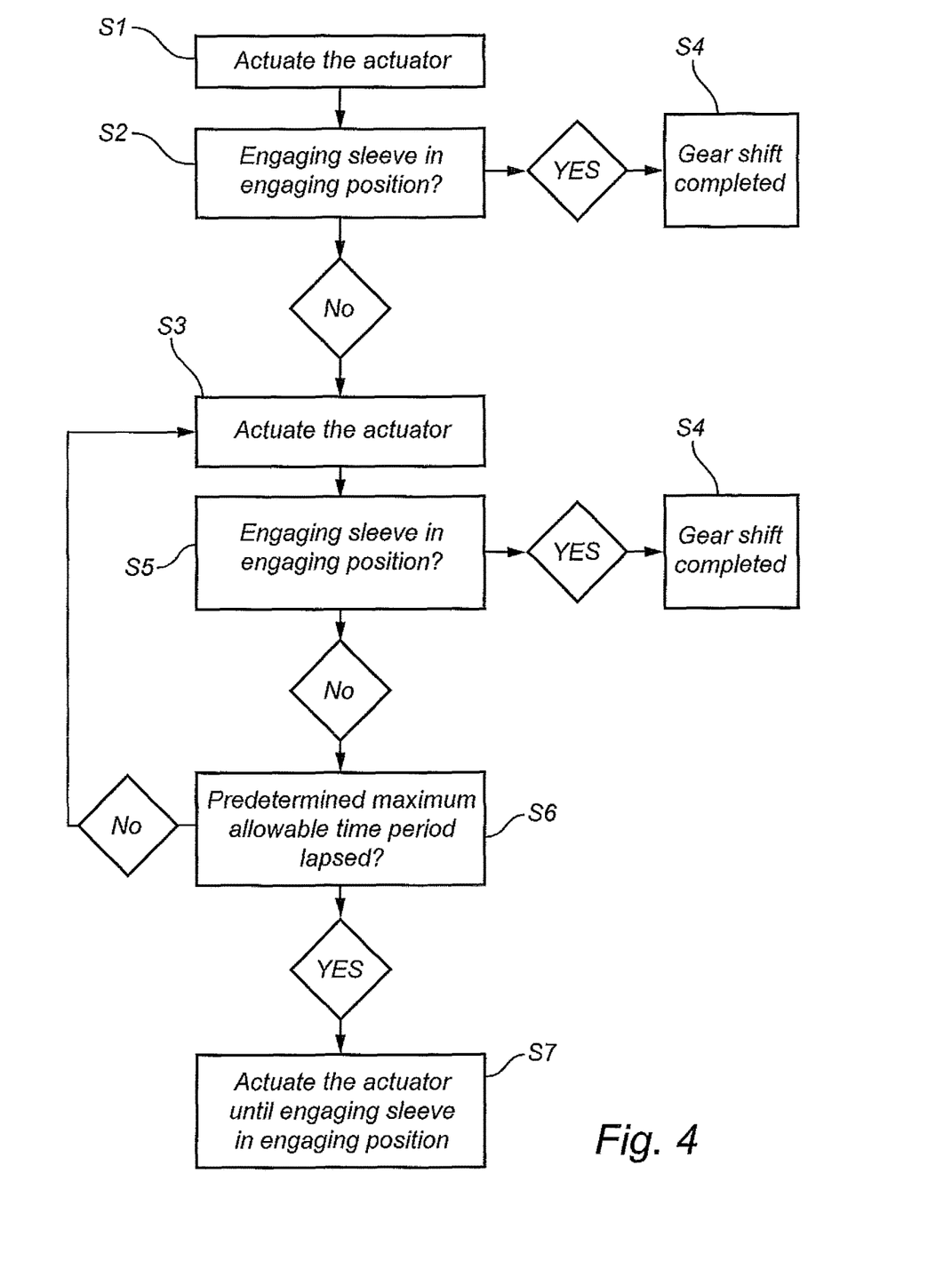
FIG. 4 is a flow chart illustrating the method according to an example embodiment of the present invention.

In order to summarize the method of executing a gear shift according to the present invention, reference is made to FIG. 4 in combination with FIG. 2.

Firstly, the actuator 204 is actuated S1 during a first predetermined time period 306 by means of positioning the first valve 232 in an open state to allow pressurized gas to be directed from the pressure supply tank 230 to the piston side 236 of the actuator 204. Thereafter, it is determined S2, during the second predetermined time period 308, whether the engaging sleeve 204 is positioned in the gear wheel engaging position or not. If the engaging sleeve 206 is positioned in the gear wheel engaging position, the gear shift is completed S4 and the process is ended. On the other hand, if it is determined that the engaging sleeve 206 is not positioned in the gear wheel engaging position after the duration of the second predetermined time period 308, the actuator 204 is actuated S3 during a third predetermined time period 312.

After the third predetermined time period 312 has lapsed, it is determined S5 during a fourth predetermined time period 314 whether the engaging sleeve 206 is positioned in the gear wheel engaging position or not. Utile engaging sleeve 206 is positioned in the gear wheel engaging position, the gear shift is completed S4 and the process is ended. On the other hand, if it is determined that the engaging sleeve 206 is not positioned in the gear wheel engaging position after the duration of the fourth predetermined time period 314 and it is determined S6 that the predetermined maximum allowable time period 318 has not lapsed, the actuator 204 is once again actuated during a fifth predetermined time period 316. If the predetermined maximum allowable time period 318 has lapsed, the control unit 240 actuates the actuator S7 until the engaging sleeve 206 reaches the gear wheel engaging position.

It is to be understood that the present invention is not limited to the embodiments described above and illustrated in the drawings; rather, the skilled person will recognize that many changes and modifications may be made within the scope of the appended claims. For example, the above described time periods when the valve is actuated and/or deactivated should be construed as examples, and that these time instances may take place slightly before or slightly after, for example, the teeth of the engaging sleeve collide with the teeth of the gear wheel. Also, the present invention in not limited to the above described number of time periods until the engaging sleeve is forced to its engaged position. Hence, more or less time periods of providing actuating pulses, to the actuator should be considered to be within the scope of the present invention.

The invention claimed is:

1. A method for controlling an actuator of a vehicle transmission, the actuator being connected to an engaging sleeve, the engaging sleeve being axially displaceable between a gear wheel disengaging position and a gear wheel engaging position of the vehicle transmission for executing a transmission gear shift, wherein the transmission gear shift is a non-synchronized gear shift and wherein the method comprises:
   actuating the actuator during a first predetermined time period for initiating a translational movement of the engaging sleeve from the gear wheel disengaging position towards the gear wheel engaging position, wherein the first predetermined time period is smaller than a total time period far the engaging sleeve to reach the gear wheel engaging position;
   determining, during a second predetermined time period initiated after the duration of the first predetermined time period, if the engaging sleeve has reached the gear wheel engaging position;
   actuating the actuator during a third predetermined time period if it was determined, that the engaging sleeve failed to reach the gear wheel engaging position during the second predetermined time period; and
   actuating the actuator until it is determined that the engaging sleeve has reached the gear wheel engaging position if the engaging sleeve failed to reach the gear wheel engaging position within a predetermined maximum allowable time period.

2. The method according to claim 1, further comprising:
   rotating the engaging sleeve around an axially extending geometric axis relative to a gear wheel to be engaged if the engaging sleeve failed to reach the gear wheel engaging position within the predetermined maximum allowable time period.

3. The method according to claim 1, wherein the first time period ends when teeth of the engaging sleeve collide with teeth of a gear wheel to which the engaging sleeve is to be connected.

4. The method according to claim 1, wherein the actuator is a pneumatic cylinder comprising a shift rod connected to the engaging sleeve.

5. The method according to claim 4, wherein the pneumatic cylinder is controlled by means of at least one valve arranged in fluid communication between the pneumatic cylinder and a pressure supply tank.

6. The method according to claim 5, wherein the time periods for actuating the pneumatic cylinder are controlled by means of positioning the at least one valve in an open state such that pressurized air is supplied from the pressure supply tank to the pneumatic cylinder.

7. A computer comprising a computer program for performing the steps of claim 1 when the program is run on the computer.

8. A non-transitory computer readable medium carrying a computer program for performing the steps of claim 1 when the program is run on a computer.

9. A control unit connectable to a vehicle transmission arranged to perform a non-synchronized gear shift and comprising an actuator connected to an engaging sleeve, wherein the engaging sleeve is axially displaceable between a gear wheel disengaging position and a gear wheel engaging position of the vehicle transmission, wherein the control unit is configured to:

actuate the actuator during a first predetermined time period for initiating a translational movement of the engaging sleeve from the gear wheel disengaging position towards the gear wheel engaging position, wherein the first predetermined time period is smaller than a total time period for the engaging sleeve to reach, the gear wheel engaging position;

determine, during a second predetermined time period initiated after the duration of the first predetermined time period, if the engaging sleeve has reached the gear wheel engaging position;

actuate the actuator during a third predetermined time period if it was determined that the engaging sleeve failed to reach the gear wheel engaging position during the second predetermined time period; and actuate the actuator until it is determined that the engaging sleeve, has reached the gear wheel engaging position if the engaging sleeve failed to reach the gear wheel engaging position within a predetermined maximum allowable time period.

10. The control unit according to claim 9, wherein the vehicle transmission further comprises at least one valve arranged in fluid communication with the actuator, wherein the control unit is connected to the at least one valve and configured to control the valve to be positioned in an open state or a closed state.

11. A vehicle transmission comprising a control unit according to claim 9.

12. The vehicle transmission according to claim 11, wherein the transmission is an automated manual transmission.

* * * * *